June 23, 1931.  H. C. DREIBUSS ET AL  1,810,949
TRUCK CONSTRUCTION
Filed Nov. 14, 1927  3 Sheets-Sheet 1
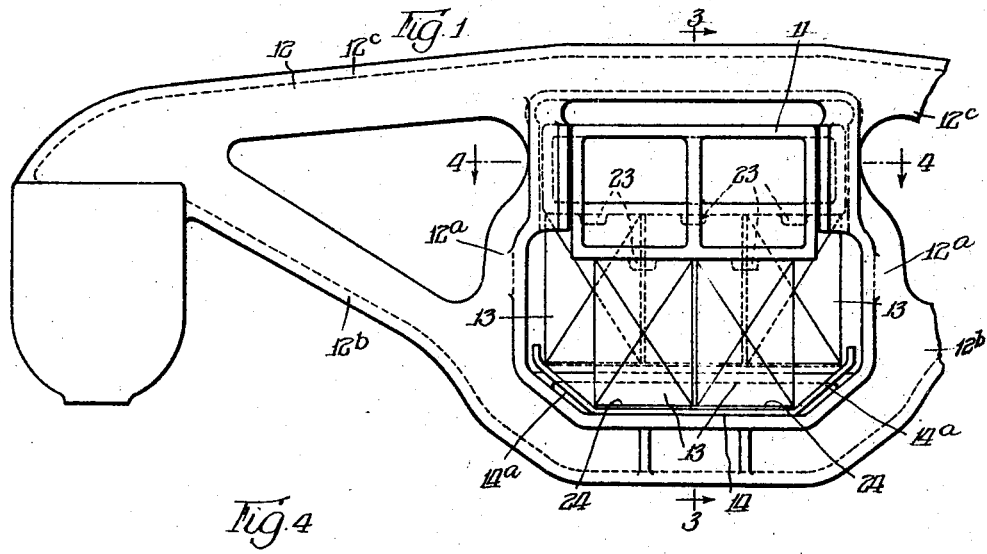
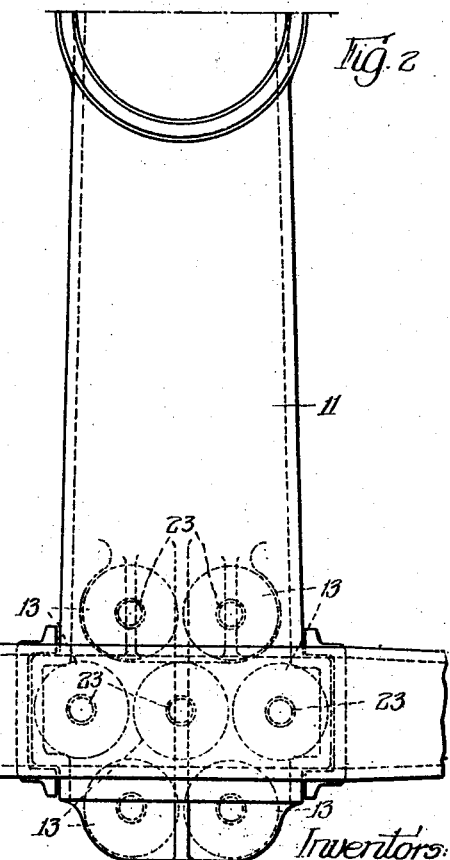
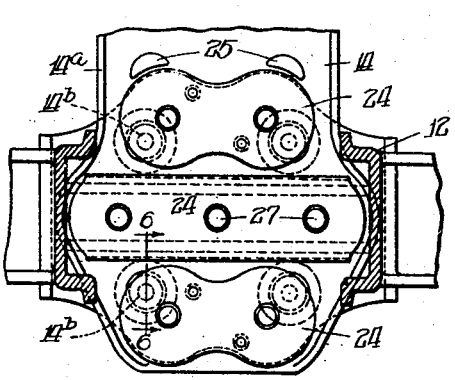
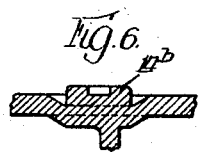
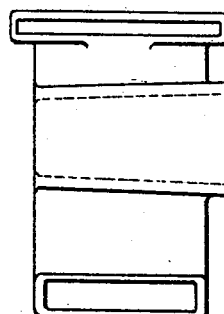

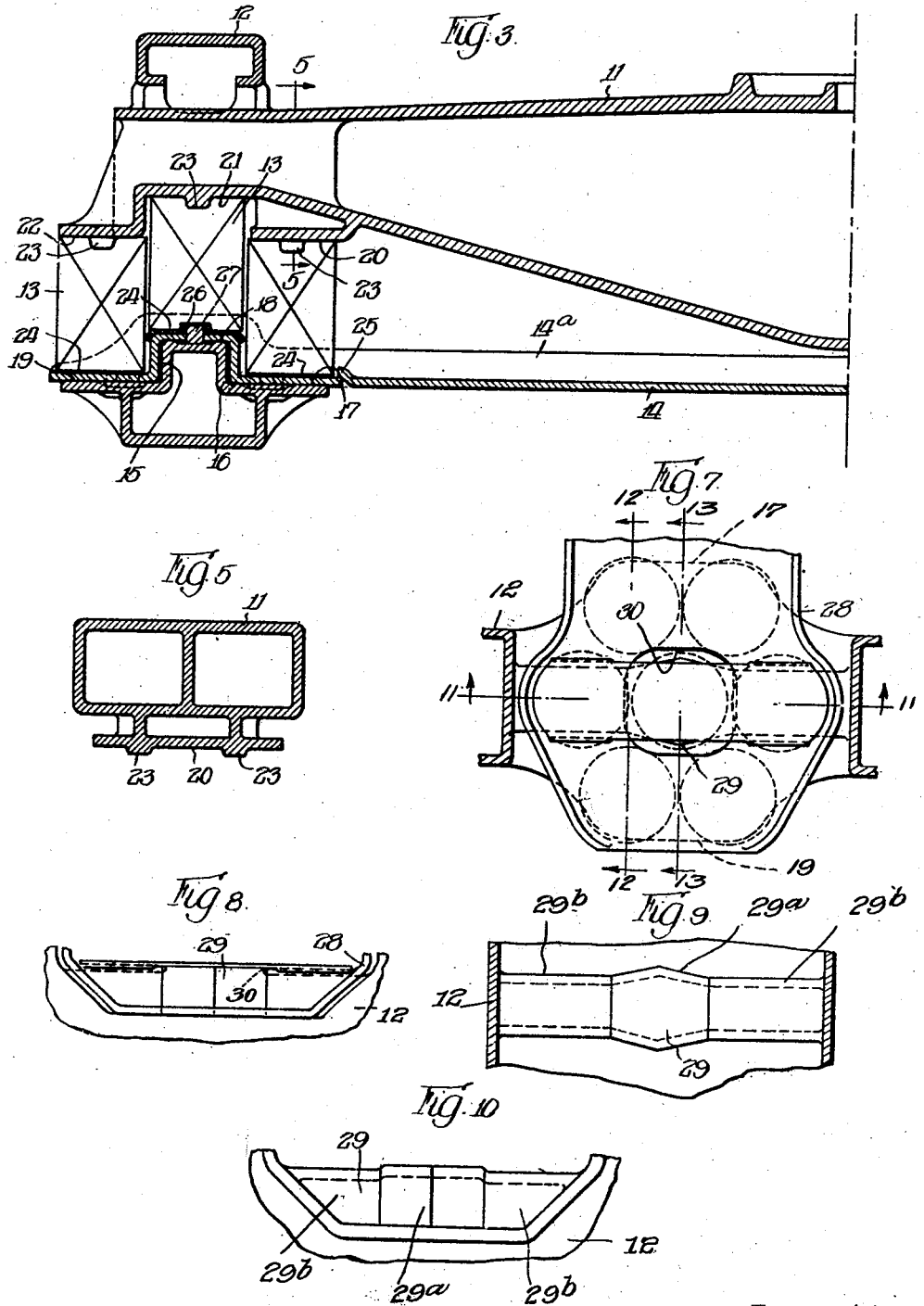

June 23, 1931.  H. C. DREIBUSS ET AL  1,810,949
TRUCK CONSTRUCTION
Filed Nov. 14, 1927  3 Sheets—Sheet 3
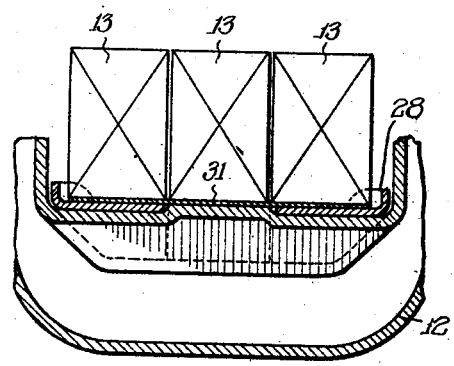
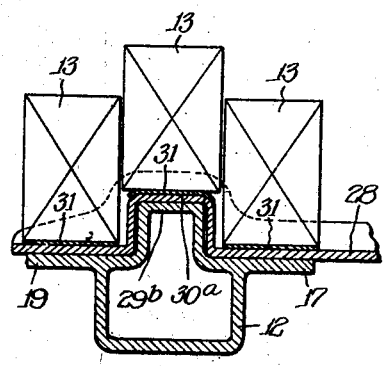
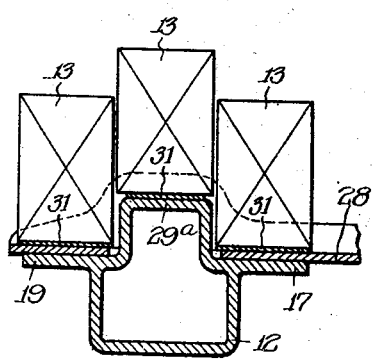
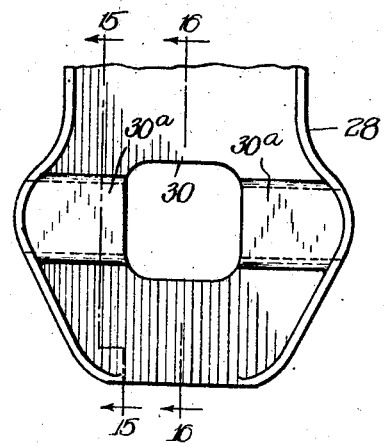
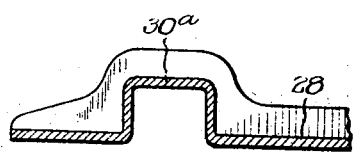
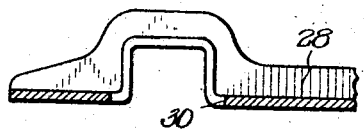
Inventors:
Harry C. Dreibuss,
George S. Chiles, Patented June 23, 1931

1,810,949

UNITED STATES PATENT OFFICE

HARRY C. DREIBUSS AND GEORGE S. CHILES, OF ST. LOUIS, MISSOURI, ASSIGNORS TO SCULLIN STEEL CO., OF ST. LOUIS, MISSOURI, A CORPORATION OF DELAWARE

TRUCK CONSTRUCTION

Application filed November 14, 1927. Serial No. 233,042.

The present invention relates to truck construction.

More particularly the present invention relates to the construction of railway car trucks and has for one of its objects the provision of a truck construction having an improved spring arrangement.

A further object is to provide a truck construction having the springs so arranged that the metal of the truck may be disposed to good advantage.

A further object is to provide a truck construction having the springs so arranged that the tension members of the side frame may be inclined upwardly toward the ends of the side frame from regions between the columns, whereby to shorten the beam length.

A further object is to provide a truck construction having the springs so arranged that the beam strength per weight of metal is improved over prior practice.

Further objects will appear as the description proceeds.

Referring to the drawings—

Figure 1 is a side view showing a portion of the side frame of a railway truck which truck embodies the principles of the present invention;

Figure 2 is a top plan view of the structure shown in Figure 1 illustrating the connection of the bolster with the side frame;

Figure 3 is a sectional view taken along the plane indicated by the arrows 3—3 of Figure 1;

Figure 4 is a sectional view taken along the plane indicated by the arrows 4—4 of Figure 1;

Figure 5 is a sectional view taken along the plane indicated by the arrows 5—5 of Figure 3;

Figure 6 is a fragmentary sectional view taken along the plane indicated by the arrows 6—6 of Figure 4;

Figures 7 and 8 are top plan and side elevation views, respectively, of a modified form of spring seat, a spring plate and spring plank being shown in position;

Figure 9 is a top plan view of the elevated spring seat forming part of the structure shown in Figure 7, said elevated spring seat in Figure 9 being shown without the spring plate and spring plank;

Figure 10 is a view similar to Figure 8 but showing the structure without the spring plate and spring plank;

Figure 11 is a sectional view taken along the plane indicated by the arrows 11—11 of Figure 7;

Figure 12 is a sectional view taken along the planes indicated by the arrows 12—12 of Figure 7;

Figure 13 is a sectional view taken along the plane indicated by the arrows 13—13 of Figure 7;

Figure 14 is a top plan view of a modified spring plank used in connection with the structure illustrated in Figures 7 to 13, inclusive;

Figure 15 is a sectional view taken along the planes indicated by the arrows 15—15 of Figure 14; and Figure 16 is a sectional view taken along the plane indicated by the arrows 16—16 of Figure 14.

The numeral 11 indicates a bolster and the numeral 12 indicates one of the side frames of a railway car truck. Said bolster is supported at each of its ends by a side frame 12, a plurality of springs being provided between each end of the bolster 11 and the corresponding side frame. Each of the side frames 12 includes the columns 12a—12a and the tension and compression members 12b and 12c. The tension members 12b, it will be noted, are inclined upwardly from regions between the columns. The beam length between the upwardly inclined portions of the tension members 12b—12b is therefore relatively short. According to the structures shown in the drawings, the springs at each end of the bolster 11 are arranged in groups of seven (though the invention is not limited to any specified number of springs), each of said springs being indicated by the numeral 13. It will be noted that of the seven springs three are arranged substantially along the center line of the corresponding side frame 12. Two springs 13 are arranged in a line parallel with said axis toward the outside of the side frame, and two springs 13 are arranged in a line parallel with said axis toward the inside of the side frame. By reference to Figure 3 it will be noted that though all of the springs 13 may have substantially the same length, the line of springs which is in alignment with the center line of the corresponding side frame is at a higher level than the inner and outer line of springs.

Referring particularly to Figures 1 to 6, the numeral 14 indicates a spring plank having the flaring side walls 14a, which spring plank is indented adjacent to its extremities in the form of an inverted U, one of which indented portions is indicated by the numeral 15 in Figure 3. Plugs 14b—14b serve to hold the spring plank 14 and the side frame 12 in proper relationship with one another. Said indented portion is seated upon the raised portion 16 of the corresponding side frame 12. By reason of the upwardly raised portion 16 of the side frame 12, three seats 17, 18 and 19 are provided in each side frame upon which the spring plank 14 may rest, the seats 17 and 19 being at one level and the seat 18 being at a higher level. The bolster 11 has horizontal, substantially flat surfaces 20, 21 and 22, each provided with downwardly extending protuberances 23—23 cooperating with the upper extremities of the springs 13—13 to hold said springs against displacement. Underlying each line of springs 13—13 is a spring plate 24. It will be noted that the most closely adjacent portions of the springs in the group disposed along the side frame medially thereof are spaced apart a distance less than the distance transversely of the frame between the axes of the other springs.

Referring now to the modification shown in Figures 7 to 10, said figures show a structure in which a slightly wider elevated spring seat may be had. In the structure shown in Figures 1 to 6, inasmuch as the spring plank 14 goes up and over the elevated spring seat portion 16, and inasmuch as the middle spring plate 24 preferably overlaps the raised portion of the spring plank 14 a slight amount, the width, transversely of the side frame 11, of the raised portion 16 is necessarily limited by the space available between the two outer lines of springs 13. In order not to spread the springs in the arrangement shown in Figures 1 to 6 any more than necessary, the width of the elevated portion 16 of the spring seat of the side frame 12 is shown somewhat less in width than the outside diameter of the springs 13 which rest upon said elevated portion 16. In the modified construction shown in Figures 7 to 16 a modified spring plank 28 is illustrated, which spring plank 28 cooperates with a modified elevated spring seat 29. Said elevated spring seat 29 has a central portion 29a, the upper level of which is disposed slightly higher than the adjacent portions of said elevated spring seat 29, which adjacent elevated portions are indicated by the numerals 29b—29b. The spring plank 28 is provided with an aperture 30 adapted to enclose the elevated portion 29a of the spring seat 29. Portions 30a—30a of the spring plank 28 overlie the portions 29b—29b of the spring seat 29. Spring plates 31—31 are provided which underlie the three lines of springs 13—13. The intermediate spring plate 31 overhangs the portions 30a—30a of the spring plank 28 a slight amount for the purpose of holding said spring plank against movement transversely of the spring seat 29.

It will be noted that the present invention provides a structure in which the reduced section of the bolster in vertical height comes in a place where very little bending action comes on the bolster. Toward the center of the bolster, the side springs, being lower, permit an increased depth of bolster. By reason of the fact that the middle row of springs are elevated, the advantage is had that the tension members of the side frame may be inclined upwardly from regions between the columns, thereby shortening the beam length, due to the upwardly inclined end portions, and giving a stronger beam, since the elevated central springs permit increased depth throughout the entire spring span.

Though certain preferred embodiments of the present invention have been illustrated and described, many modifications will occur to those skilled in the art. It is intended to cover all such modifications that fall within the scope of the appended claims.

What is claimed is—

1. A railway car truck comprising, in combination, a side frame, a bolster, and a plurality of springs for supporting the bolster for said side frame, said springs having their axes arranged in a plurality of planes arranged transversely of said side frame, one of said planes including the longitudinal center line of said side frame, the springs having their axes in said last mentioned plane being at a higher level than the springs in said other planes.

2. In a railway car truck, in combination, a side frame, a bolster, a plurality of springs for supporting said bolster from said side frame, said springs being arranged in three parallel planes spaced transversely of said side frame, the middle of said planes including the longitudinal center line of said side frame, said side frame being provided with seats for said springs, the seats for said middle line of springs being at a higher level than the seats for the other lines of springs.

3. In a railway car truck, in combination, a side frame, a bolster, said side frame comprising tension members and compression members and columns connecting said tension members and compression members, said bolster being located between said columns, and a plurality of springs having their axes parallel for supporting said bolster from said side frame, said springs being arranged in parallel planes, one of said planes including the longitudinal center line of said side frame, the springs having their axes in said last mentioned plane being elevated above the others of said springs, said tension members of said side frame being inclined upwardly from regions disposed between said columns.

4. In combination, in a railway truck, a side frame having spaced columns, tension members and compression members, and a bolster between said columns, said side frame having spring seats between said columns extending longitudinally of said frame, one of said spring seats being in alignment with said tension and compression members and being at a higher level than the others of said spring seats.

5. In a railway car truck, in combination, side frames, and a spring plank connecting said side frames, said side frames being provided with spring seats arranged transversely and extending longitudinally thereof, certain of said spring seats being at the level of said spring plank, an intermediate spring seat being disposed at a higher level, said spring plank being recessed for the reception of said last mentioned spring seat.

6. In a railway car truck, in combination, a side frame, spring seats extending longitudinally of said side frame, each of said spring seats being adapted to carry a plurality of springs, an intermediate spring seat being disposed at a higher level than the others of said spring seats, springs carried by said spring seats, and a bolster carried by said springs, said bolster being provided with bearing portions uniformly spaced above the corresponding spring seats of said side frame.

7. In a railway car truck, in combination, a side frame, a bolster, said side frame comprising tension members and compression members and columns connecting said tension members and compression members, said bolster being located between said columns, and a plurality of springs having their axes parallel for supporting said bolster from said side frame, said springs being arranged in parallel planes, one of said planes including the longitudinal center line of said side frame, the springs having their axes in said last mentioned plane being elevated above the others of said springs and being disposed in close proximity to one another.

8. In a structure of the class described, a side frame comprising an upper compression member, a lower tension member and columns, a spring assemblage supported by said side frame between said columns, said assemblage comprising three rows of springs having their axes in parallel planes disposed transversely of said side frame, the middle row of springs being disposed at a higher level than the outer rows of springs and being disposed in close proximity to one another.

9. In a structure of the class described, a side frame comprising upper compression members, lower tension members and columns, a spring assemblage supported by said side frame between said columns, said assemblage comprising three rows of springs having their axes disposed transversely of said side frame, the middle row of springs being disposed at a higher level than the other rows of springs, said middle row of springs being in alignment with the longitudinal center line of said side frame, the springs in each row being closely adjacent to each other, said tension members being inclined upwardly from regions between said columns.

10. In a structure of the class described, a side frame comprising upper and lower compression and tension members and columns, a spring plank supported by said side frame between said columns, an assemblage of springs between said columns, said springs being arranged in three rows having their axes in three parallel planes disposed transversely of said side frame, the springs in said middle row being disposed at a higher level than the other of said springs and being disposed in close proximity to one another.

11. In a railway car truck, a side frame for said truck having a spring plank seat, said seat comprising a pair of shelves extending laterally with respect to the said frame and located in a common horizontal plane, and an intermediate shelf located in a plane above that in which the said shelves are located.

12. In a railway car truck, a side frame for said truck having a spring plank seat, a spring plank engaging the said seat, said seat comprising inner and outer shelves extending laterally with respect to the said frame and located in a common plane, and an intermediate shelf located in a plane above that of the said shelves, the said spring plank having inner, outer, and intermediate portions which overlie and fit the inner, outer, and intermediate shelves of the said seat.

13. In a railway car truck, a spring plank having inner and outer spring supporting portions located in a common plane and an intermediate portion located in a plane above that of the said portions, the said intermediate portion being of greater length than the said portions, and flanges formed on the side edges of the said spring plank, portions of which flanges are curved to hug the adjoining springs which are supported upon the said intermediate portion of the said spring plank.

14. A side frame for a railway car truck comprising a hollow, bottom tie member, shelves extending laterally from said member in a common plane with the upper side of said member, and a projection extending upwardly from said side, said shelves and projection forming a seat for engagement with a spring plank.

15. In a railway car truck, the combination of a side frame, a plurality of truck springs carried by said frame arranged in inner, outer and intermediate groups, said inner and outer groups being supported by means positioned in a common plane and said intermediate group by means positioned in a higher plane, and a bolster carried by said intermediate spring group through the under side thereof and including dependent projections from said under side for carriage by said inner and outer groups.

16. In a railway car truck, the combination of a side frame, a plurality of truck springs carried by said frame arranged in spaced and an intermediate group, said spaced groups being supported by means positioned in a common plane and said intermediate group by means positioned in a different plane, and a bolster carried by said springs and shaped on the under side to conform to the different elevations of said spring groups.

17. A side frame for a railway car truck comprising a tension member, compression member, and columns extending therebetween, said tension member being formed as a box section with a portion of the upper web thereof offset above the section to form an intermediate shelf extending between said columns and having a width less than said section, shelves extending laterally from the sides of said member in a plane common with the portions of said web below said intermediate shelf, and said last named web portions extending upwardly towards the ends of said frame from points between and merging into said columns.

18. In a railway car truck, the combination of a side frame, a plurality of truck springs carried by said side frame, said springs including a group having their axes in a vertical plane extending along the length of said side frame and other springs spaced transversely of said side frame, said side frame including a continuous horizontal seat for the springs in said group, said continuous horizontal seat extending lengthwise of said side frame, said other springs being seated in a common horizontal plane different from the plane of said continuous horizontal seat, said springs having their tops disposed at a plurality of elevations, and a bolster carried by said springs and shaped on its under side to conform to the different elevations of the tops of said springs.

19. In a railway car truck, the combination of a side frame, a plurality of truck springs carried by said side frame, said springs including a group having their axes in a vertical plane extending along the length of said side frame and other springs spaced transversely of said side frame, all of said springs having substantially the same length, said side frame including a continuous horizontal seat for the springs in said group, said continuous horizontal seat extending lengthwise of said side frame, said other springs being seated in a common horizontal plane different from the plane of said continuous horizontal seat, and a bolster carried by said springs and shaped on its under side to conform to different elevations of the tops of said springs.

20. In a railway car truck, the combination of a side frame, a plurality of truck springs carried by said side frame, said springs including a group having their axes in a vertical plane extending along the length of said side frame and other springs spaced transversely of said side frame, the springs in said group being seated in a common horizontal plane and being disposed in adjacent relationship one to another, said other springs being seated in a common horizontal plane different from said first-mentioned horizontal plane, said springs having their tops disposed at a plurality of elevations, and a bolster carried by said springs and shaped on its under side to conform to different elevations of the tops of said springs.

21. In a railway car truck, the combination of a side frame, a plurality of truck springs carried by said side frame, said springs including a group having their axes in a vertical plane extending along the length of said side frame, and other springs spaced transversely of said frame, all of said springs having substantially the same length, the springs in said group being seated in a common horizontal plane and being in adjacent relationship one to another, said other springs being seated in a common horizontal plane different from said first-mentioned horizontal plane, and a bolster carried by said springs and shaped on its under side to conform to different elevations of the tops of said springs.

Signed at St. Louis, Mo., this 8th day of Nov., 1927.

HARRY C. DREIBUSS.
GEORGE S. CHILES.